(12) United States Patent
Blair

(10) Patent No.: US 11,079,132 B2
(45) Date of Patent: Aug. 3, 2021

(54) SYSTEM AND METHOD FOR MANAGING POWER CONSUMPTION OF AN HVAC SYSTEM

(71) Applicant: Trane International Inc., Davidson, NC (US)

(72) Inventor: Daniel John Blair, Tyler, TX (US)

(73) Assignee: Trane International Inc., Davidson, NC (US)

( * ) Notice: Subject to any disclaimer, the term of this patent is extended or adjusted under 35 U.S.C. 154(b) by 239 days.

(21) Appl. No.: 16/435,759

(22) Filed: Jun. 10, 2019

(65) Prior Publication Data

US 2020/0386434 A1 Dec. 10, 2020

(51) Int. Cl.
| | |
|---|---|
| F24F 11/47 | (2018.01) |
| H02J 9/06 | (2006.01) |
| G05B 15/02 | (2006.01) |
| F24F 11/65 | (2018.01) |
| F24F 11/88 | (2018.01) |
| F25B 27/00 | (2006.01) |

(52) U.S. Cl.
CPC .......... F24F 11/47 (2018.01); F24F 11/65 (2018.01); F24F 11/88 (2018.01); F25B 27/00 (2013.01); G05B 15/02 (2013.01); H02J 9/061 (2013.01); H02J 9/068 (2020.01)

(58) Field of Classification Search
None
See application file for complete search history.

(56) References Cited

U.S. PATENT DOCUMENTS

| | | | |
|---|---|---|---|
| 6,067,030 A | 5/2000 | Burnett et al. | |
| 6,369,544 B1 * | 4/2002 | Kadah | F24F 11/77 318/772 |
| 6,891,478 B2 | 5/2005 | Gardner | |
| 7,389,159 B2 | 6/2008 | Warren et al. | |
| 7,561,977 B2 | 7/2009 | Horst et al. | |
| 7,933,689 B2 * | 4/2011 | Warren | H02J 9/06 700/292 |
| 7,948,117 B2 | 5/2011 | Lathrop et al. | |
| 8,183,995 B2 | 5/2012 | Wang et al. | |

(Continued)

FOREIGN PATENT DOCUMENTS

CN 101969224 A * 2/2011 ............. F25B 41/04

*Primary Examiner* — Mohammad Ali
*Assistant Examiner* — Kelvin Booker
(74) *Attorney, Agent, or Firm* — Womble Bond Dickinson (US) LLP

(57) ABSTRACT

A system and method for managing power consumption of HVAC system includes a transfer switch, a detector interface and an HVAC controller of the HVAC system. The transfer switch is configured to switch a power line supplied to a load between a utility power source and a backup power source. The detector interface is in communication with the transfer switch or a controller of the backup power source and the HVAC controller. The HVAC controller is configured to receive data regarding the switching of power line supplied to the load between the utility power source and the backup power source and control an operation of components of the HVAC system based on the capacity of power source, thereby manages or lowers the power consumption of HVAC system. The detector interface is configured to provide switching information and capacity of the backup power source to the HVAC controller.

18 Claims, 5 Drawing Sheets

(56) References Cited

U.S. PATENT DOCUMENTS

| | | |
|---|---|---|
| 8,290,628 B2 | 10/2012 | Yeo |
| 8,350,405 B2 | 1/2013 | Vicari et al. |
| 8,410,633 B2 | 4/2013 | Batzler et al. |
| 8,412,654 B2 | 4/2013 | Montalvo |
| 9,595,070 B2 | 3/2017 | Matsuoka et al. |
| 9,760,152 B2 * | 9/2017 | Ajiro .................... G06F 1/3212 |
| 9,871,411 B2 | 1/2018 | Ortner |
| 10,452,083 B2 * | 10/2019 | Warren ............... F24D 19/1048 |
| 2003/0036810 A1 | 2/2003 | Petite |
| 2007/0145949 A1 * | 6/2007 | Matsushima ............. H02J 7/00 320/132 |
| 2007/0213876 A1 * | 9/2007 | Warren .............. G05D 23/1924 700/276 |
| 2008/0058997 A1 | 3/2008 | Timblin |
| 2010/0019574 A1 | 1/2010 | Baldassarre et al. |
| 2012/0046798 A1 * | 2/2012 | Orthlieb .................. H02J 9/062 700/297 |
| 2012/0065787 A1 | 3/2012 | Broniak et al. |
| 2015/0276253 A1 | 10/2015 | Montalvo |

\* cited by examiner

SYSTEM AND METHOD FOR MANAGING POWER CONSUMPTION OF AN HVAC SYSTEM

BACKGROUND

1. Technical Field

The present disclosure relates to air conditioner and heat pump systems, and more particularly, to systems and methods for managing power consumption of a heating, ventilation, and air conditioning (HVAC) system while powered from a backup power source.

2. Background of Related Art

Currently, an HVAC system does not manage its energy consumption based on the source of AC power. When a power outage occurs in a home equipped with a backup generator, a significant portion of the backup generator's capacity could be utilized by the HVAC system. This leaves the remaining generator capacity to meet the other power needs within the home. Existing HVAC systems do not adjust output to account for the varying capacity of different AC input power sources.

Typically, a homeowner must choose in advance which loads to prioritize during backup power operation. This could result in the HVAC system being turned off completely in favor of lighting, refrigerators and freezers, other HVAC zones, medical equipment, and so forth.

A system to limit the maximum output power of the HVAC system when it is operating on a backup power source to efficiently utilize and balance the capacity of the generator to meet all the specific needs within the home while still maintaining at least a minimal level of comfort would be a welcome advance.

SUMMARY

Disclosed herein is a system and method for managing power consumption of an HVAC system. In an exemplary embodiment, a system for managing power consumption of an HVAC system includes a transfer switch configured to switch a power line supplying the HVAC system between a utility power source and a backup power source, and an HVAC controller in communication with the transfer switch. The HVAC controller is configured to receive data regarding switching of the power line supplied to the HVAC system between the utility power source and the backup power source, and control an operation of the HVAC system based on a capacity of the backup power source.

In some embodiments, the system of claim includes a backup power source controller in communication with the transfer switch and the backup power source. The capacity of the power source is communicated to the HVAC controller by the backup power source controller.

In some embodiments, controlling an operation of the HVAC system includes reducing the maximum operating speed of one or more rotary components of the HVAC system.

In some embodiments, controlling an operation of the HVAC system includes modifying a setpoint of the HVAC system.

In some embodiments, controlling an operation of the HVAC system includes changing the operating speed of one or more rotary components of the HVAC system to a low-speed mode.

In some embodiments, the data regarding switching of the power line is communicated to the HVAC controller via the transfer switch.

In some embodiments, the system includes a detector configured to detect current flow from the backup power source. The data regarding switching of the power line is communicated to the HVAC controller by the detector.

In some embodiments, the system includes a backup power source controller operatively associated with the backup power source. The data regarding switching of the power line is communicated to the HVAC controller via the backup power source controller.

In some embodiments, the capacity of the power source is communicated to the HVAC controller via the backup power source controller.

In some embodiments, the data regarding switching of the power line and the capacity of power source is communicated to the HVAC controller via a relay switch.

In some embodiments, the data regarding switching of the power line and the capacity of power source is communicated to the HVAC controller via an internet server in communication with the backup power source.

In another exemplary embodiment of the present disclosure, an HVAC controller for managing power consumption of an HVAC system includes an interface configured to receive a signal indicative of an operating status of a backup power source that powers the HVAC system when utility power is unavailable, a processor operatively coupled to the interface, a memory operatively coupled to the processor and including a set of executable instructions, which, when executed by the processor, cause the HVAC controller to reduce a maximum power consumption of the HVAC system when the backup power source is powering the HVAC system.

In some embodiments, an interface configured to receive a signal indicative of an operating status of a backup power source includes a current sensor attachable to a power feed of the backup power source.

In some embodiments, the interface configured to receive a signal indicative of an operating status of a backup power source includes a data interface configured to receive a data signal from a backup power source controller operatively associated with the backup power source.

In some embodiments, reducing a maximum power consumption of the HVAC system includes raising a temperature setpoint while in a cooling mode or lowering a temperature setpoint while in a heating mode.

In some embodiments, the interface configured to receive a signal indicative of an operating status of a backup power source includes a data interface configured to receive a data signal from an internet server operatively associated with the backup power source.

In some embodiments, the signal indicative of an operating status of a backup power source includes information selected from the group consisting of maximum power capacity, available power, current power usage, fuel level, and remaining runtime.

In yet another embodiment of the present disclosure, a method for managing power consumption of an HVAC system includes providing an HVAC system comprising a transfer switch, a detector, and an HVAC controller. T the detector is in communication with the transfer switch or a controller of a backup power source, and the HVAC controller. The method includes switching a utility power line of the utility power source connected to a load of the HVAC system to a generator power line of the backup power source, detecting and sending data relating to switching of the power line to the HVAC controller, receiving a data of the backup power source by the HVAC controller, and controlling an operation of one or more components of the HVAC system based on the data of the backup power source to reduce power consumption the HVAC system.

In some embodiments, the data of the backup power source includes information selected from the group consisting of maximum power capacity, available power, current power usage, fuel level, and remaining runtime.

In some embodiments, the detector can be a current sensor, a relay switch, or a data link.

Other features and advantages will become apparent from the following description of the preferred embodiments, taken in conjunction with the accompanying drawings.

BRIEF DESCRIPTION OF THE DRAWINGS

Various embodiments of the disclosed system and method are described herein with reference to the accompanying drawings, which form a part of this disclosure, wherein.

Figure 1:
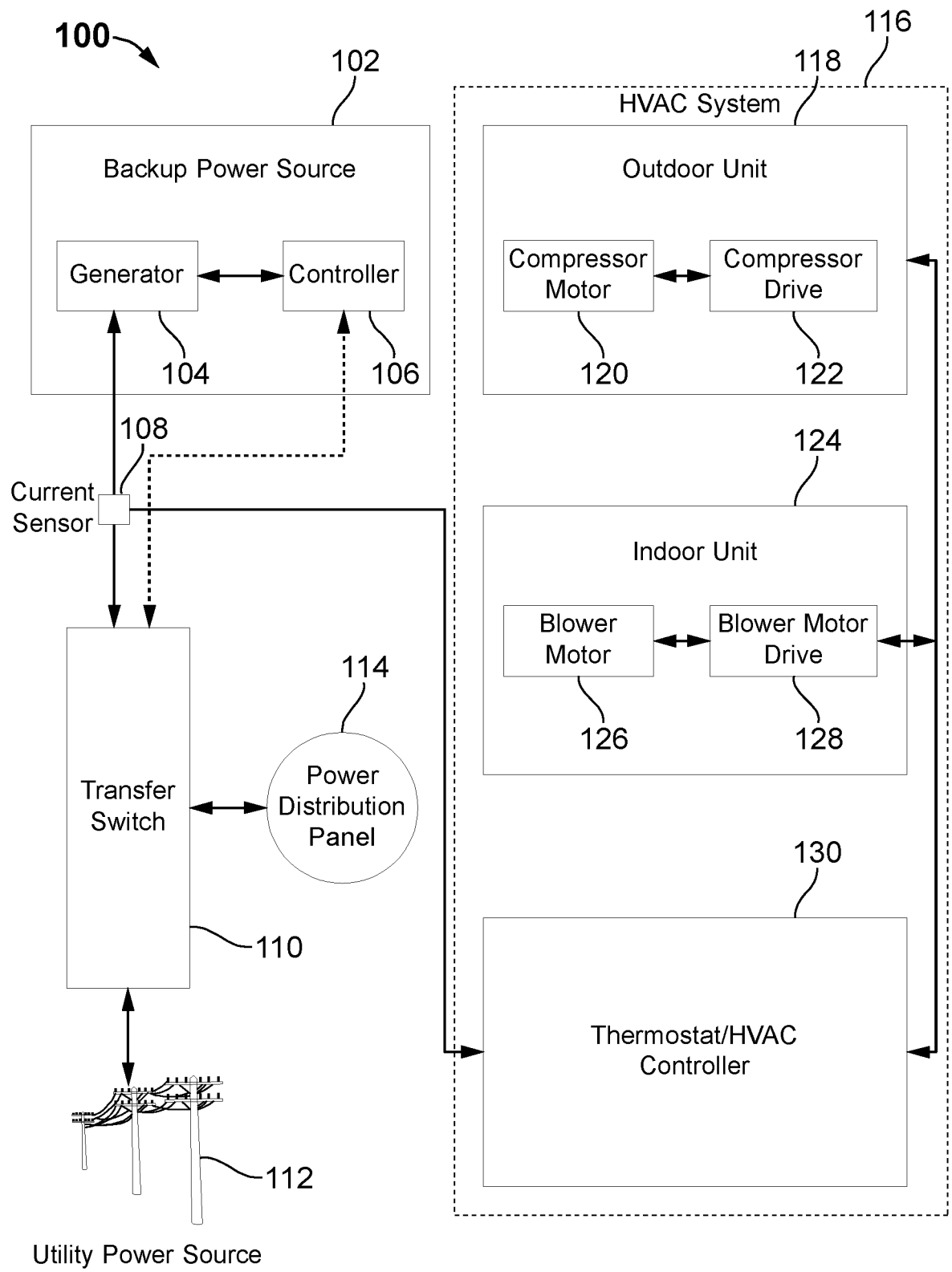
FIG. 1 illustrates a system for managing power consumption of HVAC components in accordance with an example embodiment of the present disclosure.

The various aspects of the present disclosure mentioned above are described in further detail with reference to the aforementioned figures and the following detailed description of exemplary embodiments.

DETAILED DESCRIPTION

Particular illustrative embodiments of the present disclosure are described herein below with reference to the accompanying drawings, however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements, which may perform the same, similar, or equivalent functions. The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary."

Referring to FIG. 1, a system 100 is configured to manage power consumption of an HVAC system 116 in accordance with an exemplary embodiment of the present disclosure. The system 100 comprises the HVAC system 116, a backup power source 102, a utility power source 112, and a transfer switch 110 connected to a power distribution panel 114. Power distribution panel 114 may include a circuit breaker panel, a fuse panel, a subpanel, or any combination thereof, that is configured to distribute electrical power to one or more circuits of the premises which, in turn, provide operating power to HVAC system 116 and/or to backup power source 102. The transfer switch 110 is coupled between at least one load, the utility power source 112, and the backup power source 102. The transfer switch 110 is configured to switch a power line supplied to the load between the utility power source 112 and the backup power source 102. In one embodiment, the utility power source 112 is a primary power source and the backup power source 102 is a secondary or auxiliary power source.

In one embodiment, the transfer switch 110 may be an automatic transfer switch configured to sense a voltage input of a utility power line from the utility power source 112 and switch to a generator power line from the backup power source 102 when utility power is restored, or if the input voltage on the utility power line from the utility power source 112 falls below a predetermined value. The predetermined value can be selected, for example, to prevent the load from being affected by a brownout or blackout condition, or to optimize performance of the load.

In one embodiment, the transfer switch 110 is configured to monitor the input voltage from the backup power source 102 and switches back to the utility power source 112 when utility power is restored or if the generator 104 voltage falls due to, for example, a lack of fuel or other reasons. By continually monitoring the input from both power sources (102, 112), the transfer switch 110 determines which power source is the most suitable for use at any given time, and seeks to maintain a relatively constant supply to the load. The power supplied to the transfer switch 110 on the utility power line and generator power line is a utility-level line voltage, typically a two-phase 120/240 VAC supply line or a three-phase line voltage such as a 360/480 VAC supply line operating at 50 or 60 Hz.

A detector, which may include a detector interface, is coupled between the backup power source 102 and the transfer switch 110. The detector is configured to measure an electrical property, such as voltage, current, power or the like to respond to a high or low voltage. The detector is configured to determine whether the load is connected to the backup power source 102 and provides signal to the HVAC system 116.

In one embodiment, the HVAC system 116 includes an indoor unit 124, an outdoor unit 118, and a thermostat or HVAC controller 130. The indoor unit 124 of the HVAC system 116 can include a first variable frequency drive (VFD) to control a speed of the HVAC rotary components in the indoor unit 124. The outdoor unit 118 includes a second variable frequency drive to control a speed of the HVAC rotary components in the outdoor unit 118. The thermostat 130 is in communication with the indoor unit 124, the detector and the outdoor unit 118, and may include a communication interface and a system controller. In one embodiment, the HVAC rotary component of indoor unit 124 includes an indoor blower motor 126. In one embodiment, the HVAC rotary components of outdoor unit 118 include a compressor motor 120. In one embodiment, the first variable frequency drive is a compressor drive 122. In some embodiments, the second variable frequency drive is a blower motor drive 128.

The present disclosure is not limited to HVAC systems which employ variable speed or variable frequency drive rotary components. Aspects of the present disclosure may be advantageously employed in single speed HVAC systems and dual speed (dual stage) HVAC systems.

The system further comprises a backup power source controller 106 in communication with the transfer switch 110 and a generator 104. The HVAC controller 130 is configured to receive data regarding switching of the power line supplied to the load from the utility power source 112 and the backup power source 102.

In the example embodiments described herein, the backup power source 102 could be a standby generator. In another embodiment, the backup power source 102 could be a backup generator powered by an internal combustion engine typically powered by natural gas (supplied by municipal pipelines), propane (stored in a local tank), or diesel fuel (local tank). In other embodiments, the backup power source 102 could additionally or alternatively include a solar panel array (photovoltaic "PV" array) using an inverter to convert PV array DC into AC mains voltage, a battery backup system with inverter, fuel cell, geothermal, etc.

When utility power source 112 is available (i.e. normally) the transfer switch 110 couples the utility power source 112 to the premises load circuits and disconnects the backup power when utility power is interrupted, the engine is automatically started, powering the generator 104. Once the generator 104 reaches stable operating conditions (e.g., constant 50 Hz or 60 Hz power is available), the transfer switch 110 couples backup power source 102 to the premises load circuits and disconnects from the utility power source 112, supplying power to the premises. In some installations, the user or installer could specify one or more individual loads (circuits) in the premises to be switched off in favor of another load. For example, the electric circuit to an HVAC system 116 could be switched off when the backup power source controller 106 determines the generator 104 is reaching maximum capacity, or when another higher priority load is active (e.g., another HVAC zone, electric stove, electric clothes dryer, etc.).

The HVAC controller 130 is configured to receive data regarding switching of the power line supplying the load from the utility power source 112 and the backup power source 102. The HVAC controller 130, in response to connection of the load to the backup power source 102, controls an operation of one or more of the components of the HVAC system 116 based on a capacity of backup power source 102.

The data regarding switching of the power line is communicated to the HVAC controller 130 via the detector in an embodiment of the present invention. The detector is in communication with the backup power source 102, the HVAC controller 130, and transfer switch 110. In one embodiment the detector is a current sensor 108. In another embodiment, the detector is hard wired to the system 100. In yet another embodiment, the detector is a wireless sensor. The current sensor 108, which can include a loop or sensing coil configured to measure current via induction, is configured to allow computation of the backup power capacity available to the HVAC system 116.

In another embodiment, the data regarding switching of the power line is communicated to the HVAC controller 130 via the transfer switch 110.

In yet another embodiment, the data regarding switching of the power line is communicated to the HVAC controller 130 via the backup power source controller 106. In an embodiment, the backup power source controller 106 is linked to the HVAC system 116 via a data connection such as a data link. The data link could provide this information directly, as well as backup power source 102 status.

In yet another embodiment, the data regarding switching of the power line is communicated to the HVAC controller 130 via a relay switch. In one embodiment, the relay connected to the backup power source 102 or the utility power source 112 could open or close to indicate the status of at least one or both power sources. The relay closure would provide a simpler interface (backup power status only), however it would impose minimal cost and complexity and be compatible with any installation.

In one embodiment, the capacity of the backup power source 102 is stored in a Maximum (Max) Power register of the VFD. The variable speed outdoor equipment, upon detection of backup power source 102, would limit maximum output power per the value stored in the Max Power register. The Max Power register refers to one such setting that defines the maximum operating speed of the HVAC system 116. In backup power mode, this register is temporarily changed to a lower setting. Aspects of a Max Power setting is described in co-owned U.S. Pat. No. 10,203,127, the entirety of which is incorporated by reference herein.

In one example embodiment, the HVAC controller 130 is configured to adjust power usage of one or more of components of the HVAC system 116 by running variable speed components at a lower speed. In another example embodiment, the HVAC controller 130 is configured to adjust power usage of the components of the HVAC system 116 by raising a setpoint in cooling mode and/or lowering a setpoint in heating mode. In yet another example embodiment, the HVAC controller 130 is configured to adjust power usage of the components of a dual speed (two stage) HVAC system 116 by running the dual stage system at low speed. In another example embodiment, the HVAC controller 130 is configured to adjust power usage of the components of a single speed (on/off) HVAC system 116 by adjusting the setpoint of the single stage system, for example, by raising the setpoint in cooling mode or lowering the setpoint in heating mode. In another embodiment, the HVAC controller 130 could optionally reduce power consumption of the HVAC system 116 even further if the fuel level/remaining runtime is low, or if desired, shut off completely.

In yet another embodiment, the HVAC controller 130 or the variable frequency drive includes one or more settings that define how the system reacts when in backup power mode. For example, the system may decrease power usage by a percentage, decrease power usage by an absolute amount, further decrease power usage or shut off completely when remaining fuel is low or less than a predetermined threshold, and/or further decrease power usage or shut off completely when remaining estimated runtime is low or beneath a predetermined threshold. In an embodiment, remaining estimated runtime may be determined by computing the product of current average fuel consumption rate and the quantity of remaining fuel.

In yet another embodiment, the HVAC controller 130 is configured to limit a dual speed system, and variable speed systems to a low speed.

In yet another embodiment, the HVAC controller 130 is configured to communicate with other climate-related systems to adjust ventilation dampers, ceiling fans, exhaust fans, blowers, etc. when backup power is used to further curtail overall power consumption of the system. These actions could be in addition to shutting down a single stage system or limiting power to a dual or variable speed system.

In yet another embodiment, the HVAC controller 130 is configured to raise (cooling mode) or lower (heating mode)

temperature set point automatically to reduce the overall energy requirements of HVAC system 116.

In yet another embodiment, the HVAC controller 130 is configured to trigger mandatory use of gas furnace in winter and shut off a heat pump.

In yet another embodiment, the HVAC controller 130 is configured to lock out backup electric heat in the winter to rely only on a heat pump.

In yet another embodiment, the HVAC controller 130 is configured to determine a lower setting by customization during installation based upon customer preference or estimated available load based upon loads of other appliances in the home, and an input of the size of the generator 104 on site, and/or by monitoring available load by communicating with generator 104.

In yet another embodiment, the HVAC controller 130 is configured to lower the power limit of the HVAC system 116.

The HVAC controller 130, in response to connection of the load to the backup power source 102, controls an operation of one or more components of the HVAC system 116 based on a capacity of backup power source 102. The capacity of backup power source 102 and switching of the power line to the backup power source 102 is communicated to the HVAC controller 130 via the detector such as current sensor 108.

Figure 2:
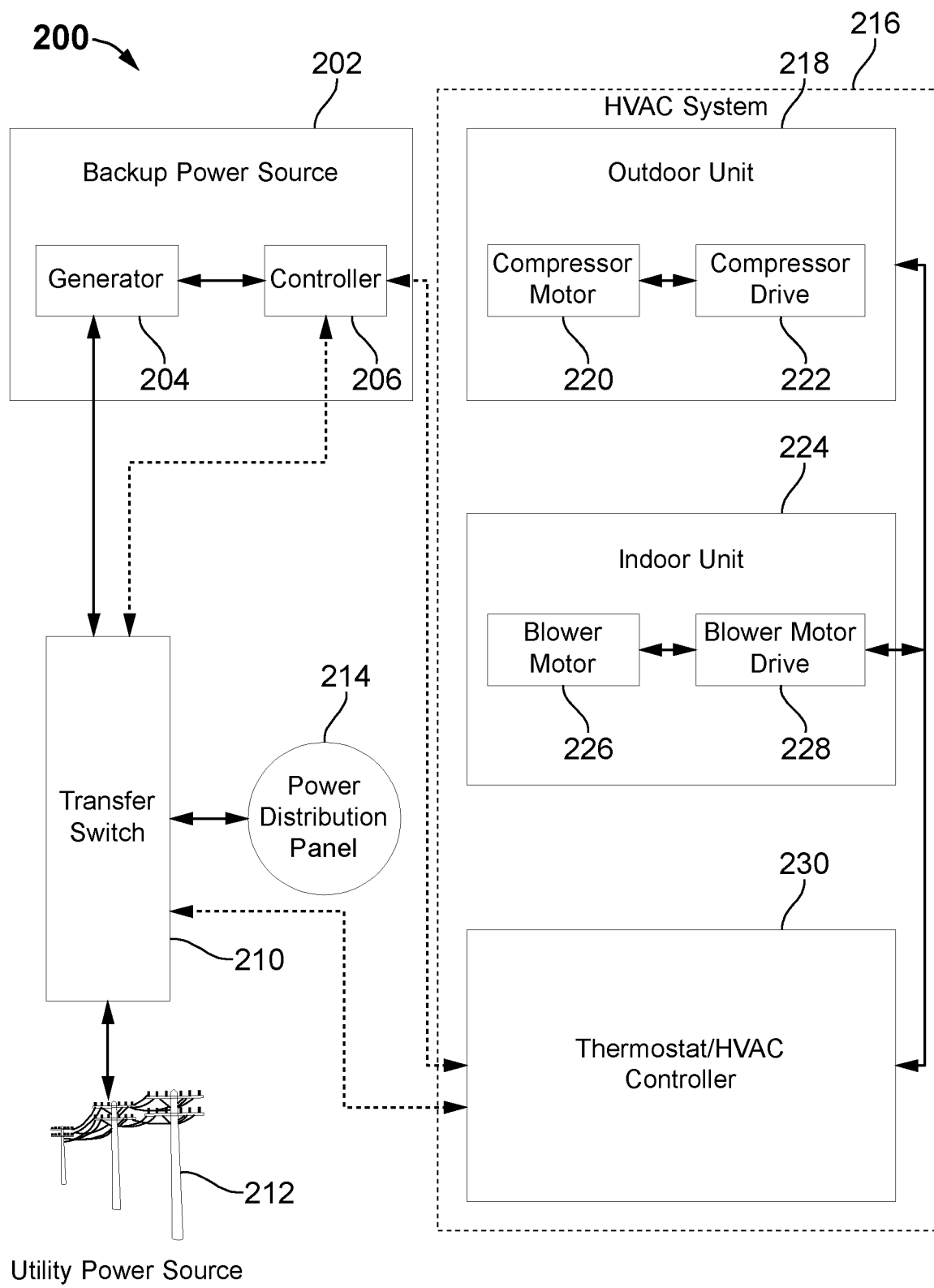
FIG. 2 illustrates a system for managing power consumption of HVAC components in accordance with another example embodiment of the present disclosure.

Referring to FIG. 2, a system 200 is configured to manage power consumption of an HVAC system 216 in accordance with another exemplary embodiment of the present disclosure. The system 200 comprises a transfer switch 210, an HVAC system 216, a utility power source 212 and a backup power source 202. The HVAC system 216 can include an indoor unit 224, an outdoor unit 218, and a thermostat or HVAC controller 230. The indoor unit 224 of the HVAC system 216 may include a first variable frequency drive (VFD) to control a speed of the HVAC rotary components in the indoor unit 224. The outdoor unit 218 may include a second variable frequency drive to control a speed of the HVAC rotary components in the outdoor unit 218. The thermostat or HVAC controller 230 is in communication with the indoor unit 224 and the outdoor unit 218, and may contain a communication interface and a system controller. In an embodiment, the HVAC rotary component of indoor unit 224 includes an indoor blower motor 226. In an embodiment, the HVAC rotary components of outdoor unit 218 include a compressor motor 220. In an embodiment, the first variable frequency drive is a compressor drive 222. In an embodiment, the second variable frequency drive is a blower motor drive 228.

The transfer switch 210 is coupled between at least one load or power distribution panel 214, the HVAC controller 230, controller 206 of the backup power source 202, the utility power source 212 and a generator 204. The transfer switch 210 is configured to switch a power line supplied to the load between the utility power source 212 and the backup power source 202. In one embodiment, the utility power source 212 is a primary power source and the backup power source 202 is a secondary or auxiliary power source.

The transfer switch 210 may be an automatic transfer switch. The transfer switch 210 is configured to sense a voltage input on a utility power line from the utility power source 212 and switches to a generator power line from the backup power source 202 when utility power is restored or if the input voltage on the utility power line from the utility power source 212 falls below a predetermined value. The predetermined value can be selected, for example, to prevent the load from being affected by a brownout or blackout condition, or to optimize performance of the load.

In one embodiment, the transfer switch 210 is configured to monitor the input voltage from the backup power source 202 and switches back to the utility power source 212 if utility power is restored or the generator voltage falls due to, for example, a lack of fuel or other reasons. By continually monitoring the input from both power sources, the transfer switch 210 determines which power source is the most suitable for use at any given time, and seeks to maintain a relatively constant supply to the load. The power supplied to the transfer switch 210 on the utility power line and generator power line may be a utility-level line voltage, typically a two- or three-phase supply as described above.

In one embodiment, the backup power source controller 206 is in communication with the generator 204 and the HVAC controller 230. The HVAC controller 230 is configured to receive data regarding switching of the power line supplied to the load from the utility power source 212 and the backup power source 202. HVAC controller 230, in response to connection of the load to the backup power source 202, controls an operation of at least one of the components of the HVAC system 216 based on a capacity of the backup power source 202, thereby managing or lowering the power consumption of HVAC system 216. The capacity of power source is communicated to the HVAC controller 230 via the backup power source controller 206. In one embodiment, the data regarding switching of the power line is communicated to the HVAC controller 230 via the transfer switch 210. In another embodiment, the data regarding switching of the power line is communicated to the HVAC controller 230 via the backup power source controller 206.

Figure 3:
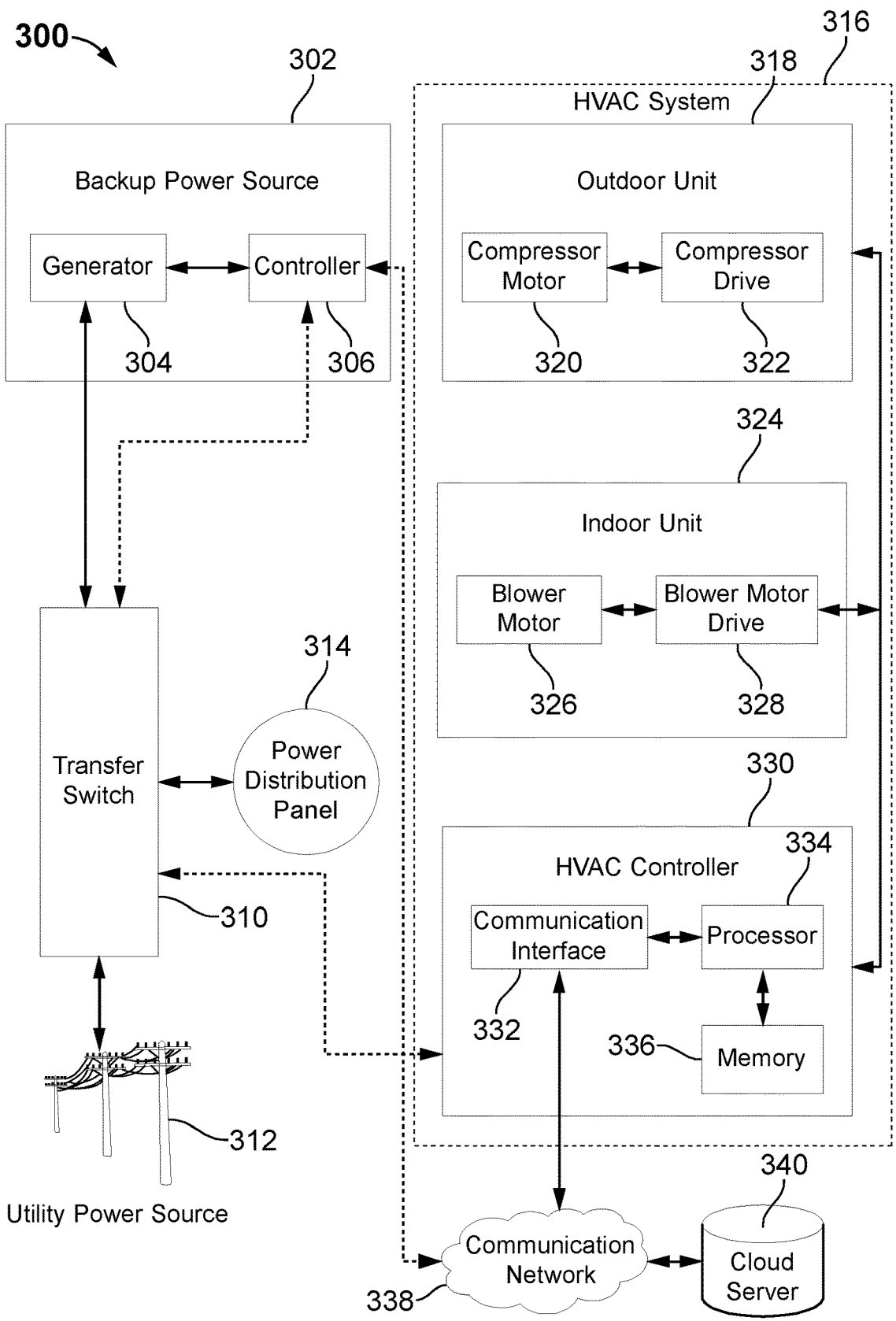
FIG. 3 illustrates a system for managing power consumption of HVAC components in accordance with yet another example embodiment of the present disclosure.

Referring to FIG. 3, a system 300 is configured to manage power consumption of HVAC system 316 in accordance with yet another exemplary embodiment of the present disclosure. The system 300 comprises a transfer switch 310, an HVAC system 316, a utility power source 312, a backup power source 302 and a cloud server or cloud-based component 340.

The HVAC system 316 may include an indoor unit 324, an outdoor unit 318, and a thermostat or HVAC controller 330. The indoor unit 324 of the HVAC system 316 may include a first variable frequency drive (VFD) to control a speed of the HVAC rotary components in the indoor unit 324. The outdoor unit 318 can include a second variable frequency drive to control a speed of the HVAC rotary components in the outdoor unit 318. HVAC controller 330 is in communication with the indoor unit 324 and the outdoor unit 318, and may include a communication interface and a system controller. In an embodiment, the HVAC rotary component of indoor unit 324 includes an indoor blower motor 326. In an embodiment, the HVAC rotary components of outdoor unit 318 may include a compressor motor 320. In an embodiment, the first variable frequency drive includes compressor drive 322. In an embodiment, the second variable frequency drive is a blower motor drive 328.

The transfer switch 310 is coupled between at least one load or power distribution panel 314, the HVAC controller 330, a backup power source controller 306, the utility power source 312, and the backup power source 302. The transfer switch 310 is configured to switch a power line supplied to the load between the utility power source 312 and the backup power source 302. In one embodiment, the utility power source 312 is a primary power source and the backup power source 302 is a secondary or auxiliary power source.

The transfer switch 310 may be an automatic transfer switch 310. The transfer switch 310 is configured to sense a voltage input on a utility power line from the utility power source 312 and switches to a generator power line from the backup power source 302 when utility power is restored or if the input voltage on the utility power line from the utility power source 312 falls below a predetermined value. The predetermined value can be selected, for example, to prevent the load from being affected by a brownout or blackout condition, or to optimize performance of the load.

In one embodiment, the transfer switch 310 is configured to monitor the input voltage from the backup power source 302 and switches back to the utility power source 312 when utility power is restored or if the generator voltage falls due to, for example, a lack of fuel or other reasons. By continually monitoring the input from both power sources, the transfer switch 310 determines which power source is the most suitable for use at any given time, and seeks to maintain a relatively constant supply to the load. The power supplied to the transfer switch 310 on the utility power line and generator power line is a utility-level line voltage, as described above.

In one embodiment, the backup power source controller 306 is in communication with the generator 304 and the HVAC controller 330. The backup power source controller 306 communicates the status thereof to cloud server 340 via communication network 338. HVAC controller 330 communicates with cloud server 340 to receive the status of backup power source 302. In embodiments, any one, some, or each of backup power source 302, communication network 338, and HVAC controller 330 may be powered by one or more uninterruptable power supplies (UPS). The UPS maintains operation of these components during the period between the moment utility power is lost and when backup power comes on-line.

In one embodiment, the backup power source controller 306 is configured to communicate data regarding the backup power source 302 to the cloud server 340. In an embodiment, the cloud server 340 is configured to store data regarding the backup power source 302. The data includes information relating to switching power line and capacity of the backup power source 302. In one embodiment, the HVAC controller 330 includes a processor 334, a memory 336 and a communication interface 332. The memory 336 comprises set of instruction configured to be executed by the processor 334. The HVAC controller 330 communicates with the cloud server 340 via the communication network 338 to access the data relating to the backup power source 302.

Figure 4:
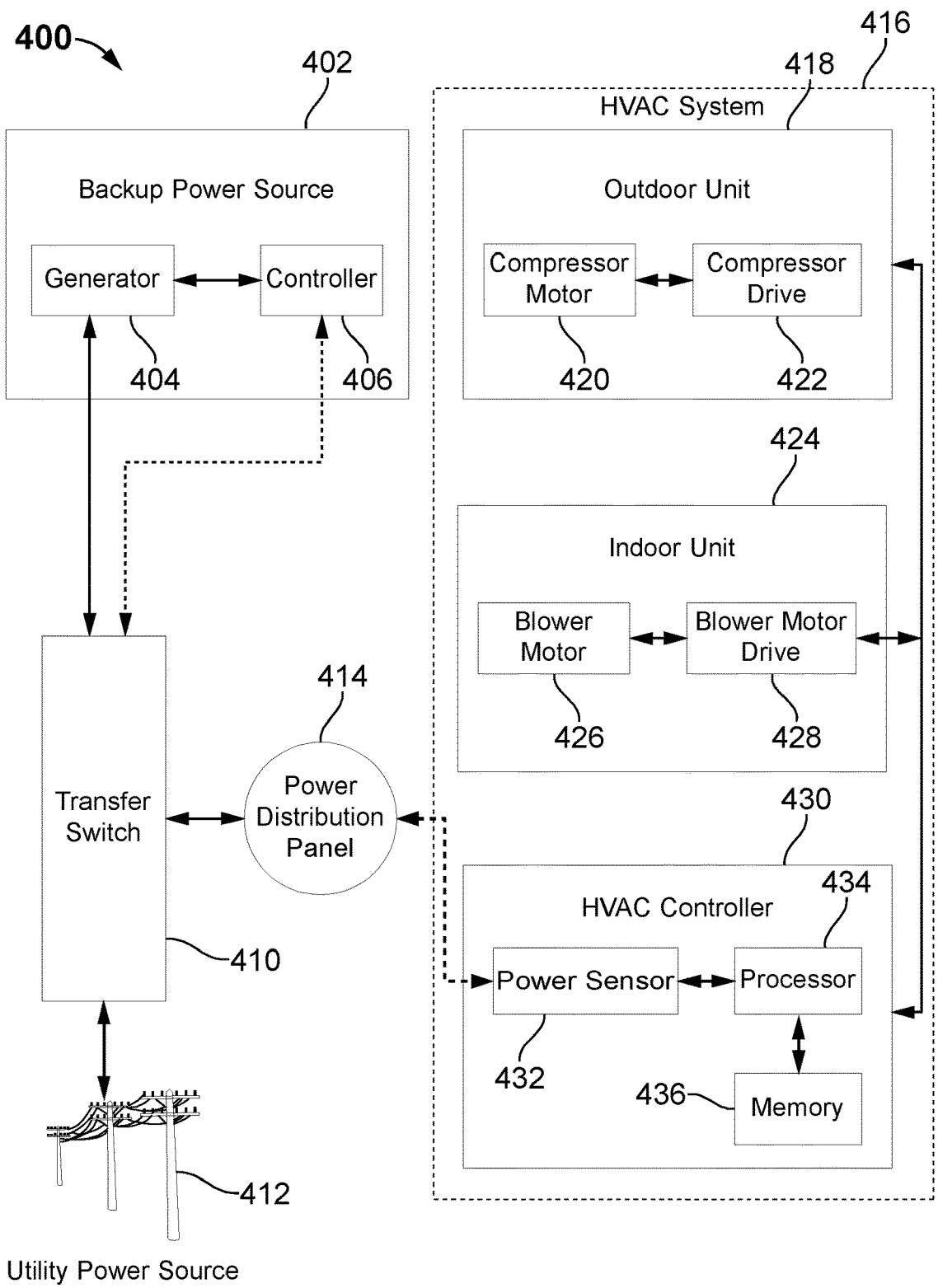
FIG. 4 illustrates a system for managing power consumption of HVAC components in accordance with still another example embodiment of the present disclosure.

Turning now to FIG. 4, a system 400 is configured to manage the power consumption of an HVAC system 416 in accordance with still another exemplary embodiment of the present disclosure. The system 400 comprises a transfer switch 410, an HVAC system 416, a utility power source 412, and a backup power source 402.

The HVAC system 416 includes an indoor unit 424, an outdoor unit 418, and a thermostat or HVAC controller 430. The indoor unit 424 of HVAC system 416 may include a first variable frequency drive (VFD) to control a speed of the HVAC rotary components in the indoor unit 424. The outdoor unit 418 can include a second variable frequency drive to control a speed of the HVAC rotary components in the outdoor unit 418. The thermostat or HVAC controller 430 is in communication with the indoor unit 424 and the outdoor unit 418, and contains in operative communication a processor 434, a memory 436, and a power sensor 432. In an embodiment, the HVAC rotary component of indoor unit 424 can include an indoor blower motor 426. In an embodiment, an HVAC rotary component of outdoor unit 418 includes a compressor motor 420. In an embodiment, the first variable frequency drive includes a compressor drive 422. In an embodiment, the second variable frequency drive includes a blower motor drive 428.

The transfer switch 410 is coupled between at least one load or power distribution panel 414, the HVAC controller 430, a backup power source controller 406, the utility power source 412, and the backup power source 402. The transfer switch 410 is configured to switch a power line supplied to the load between the utility power source 412 and the backup power source 402. In one embodiment, the utility power source 412 is a primary power source and the backup power source 402 is a secondary or auxiliary power source.

The transfer switch 410 may be an automatic transfer switch. The transfer switch 410 is configured to sense a voltage input on a utility power line from the utility power source 412 and switches to a generator power line from the backup power source 402 when utility power is restored or if the input voltage on the utility power line from the utility power source 412 falls below a predetermined value. The predetermined value can be selected, for example, to prevent the load from being affected by a brownout or blackout condition, or to optimize performance of the load.

In one embodiment, the transfer switch 410 is configured to monitor the input voltage from the backup power source 402 and switches back to the utility power source 412 when utility power is restored or if the generator voltage falls due to, for example, a lack of fuel or other reasons. By continually monitoring the input from both power sources, the transfer switch 410 determines which power source is the most suitable for use at any given time, and maintain a relatively constant supply to the load. The power supplied to the transfer switch 410 on the utility power line and generator power line is a utility-level line voltage, as described above.

Power sensor 432 is coupled to a circuit of the premises powered by power distribution panel 414, such as the circuit which provides power to HVAC controller 430. Power sensor 432 monitors the premises voltage waveform to detect the loss of utility voltage and subsequent switch to backup power. In one embodiment the detection comprises monitoring properties of a waveform such as frequency, waveshape, harmonic content, jitter, and/or amplitude to identify the source of power to establish a waveform fingerprint. For example, utility power may be identified by a steady 60 Hz frequency, very little harmonic content (e.g., a pure sine wave), and/or steady 110 VAC voltage. Backup power may be identified by observing deviations from the ideal 60 Hz frequency (e.g., fluctuating between 59.8 Hz and 60.2 Hz), increased harmonic content (non-sinusoidal waveforms), varying amounts of jitter, and/or varying AC voltage. A complete loss of power for a length of time corresponding to generator startup and stabilization time, taken alone or together with the waveform fingerprint may also be used to determine whether the system 400 is operating on utility or backup power. Power consumption of HVAC system 416 is then adjusted by HVAC controller 430 according to whether utility power or backup power is being used.

Figure 5:
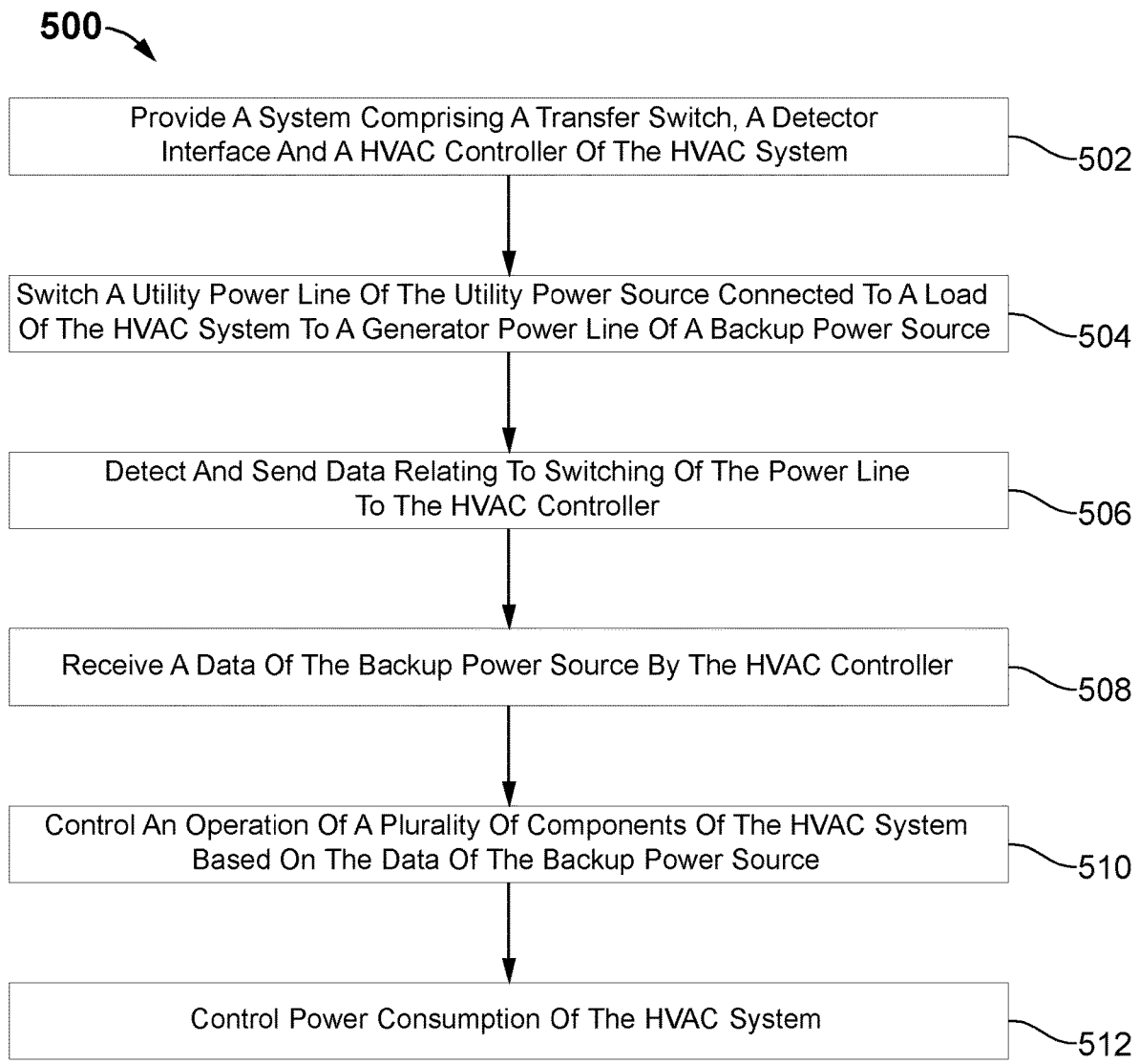
FIG. 5 illustrates a method for managing power consumption of HVAC components in accordance with an example embodiment of the present disclosure.

Referring to FIG. 5, the present disclosure provides a method 400 for managing power consumption of an HVAC system. The method 500 comprises a step 502 of providing a system comprising a transfer switch, a detector interface and an HVAC controller of the HVAC system. The transfer switch is configured to switch a power line supplied to a load between a utility power source and a backup power source. The detector interface is in communication with the transfer switch or a controller of the backup power source and the HVAC controller. The detector interface is configured to provide switching information and capacity of the backup power source to the HVAC controller. The method 500 further comprises a step 504 of switching a utility power line of the utility power source connected to a load of the HVAC system to a generator power line of the backup power source. The method 500 further comprises a step 506 of detecting and sending data relating to switching of the power line to the HVAC controller. The method 500 further comprises a step 508 of receiving a data of the backup power source by the HVAC controller. The data of the backup power source includes total power, available power, total-current usage, fuel level, remaining runtime and capacity of the backup power source. The method 500 further may include a step 510 of controlling an operation of one or more components of the HVAC system based on the data of the backup power source. The method 500 further comprises a step 512 of controlling power consumption of one or more HVAC components of the HVAC system 116.

Advantageously, the system (100, 200, 300, 400) is configured to be aware of when the premises is running on backup power, to enable reduction of power consumption. Therefore, the system (100, 200, 300, 400) can enable the HVAC system 116 to operate and provide comfort rather than simply shutting off. The system (100, 200, 300, 400) is configured to limit the maximum output power of the HVAC system when it is operating on backup power source. Thus, the system (100, 200, 300, 400) could efficiently utilize and balance the capacity of the generator 104 to meet all the specific needs within the home while still maintaining at least a minimal level of comfort. Further, the system (100, 200, 300, 400) may reduce the value of a Max Power register when the system (100, 200, 300, 400) detects that the HVAC system 116 is operating from a backup power source 102. This could eliminate the need of homeowner to shut off their HVAC system 116 to avoid tripping the generator's breaker if the homeowner prioritizes lights, freezer, etc. over indoor temperature.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A system for managing power consumption of a heating, ventilation and air conditioning (HVAC) system, comprising:
   a transfer switch configured to switch a power line supplying the HVAC system between a utility power source and a backup power source; and
   an HVAC controller in communication with the transfer switch and configured to:
   receive data regarding switching of the power line supplied to the HVAC system between the utility power source and the backup power source; and
   control an operation of the HVAC system based on a capacity of the backup power source, including reducing the maximum operating speed of one or more rotary components of the HVAC system, or modifying a setpoint of the HVAC system in which a temperature setpoint is raised or lowered while in respectively a cooling mode or a heating mode.

2. The system of claim 1, further comprising a backup power source controller in communication with the transfer switch and the backup power source, wherein the capacity of the power source is communicated to the HVAC controller by the backup power source controller.

3. The system of claim 1, further comprising a detector configured to detect current flow from the backup power source, wherein the data regarding switching of the power line is communicated to the HVAC controller by the detector.

4. The system of claim 1, wherein the data regarding switching of the power line and the capacity of power source is communicated to the HVAC controller via an internet server in communication with the backup power source.

5. The system of claim 1, wherein control an operation of the HVAC system comprises changing the operating speed of one or more rotary components of the HVAC system to a low-speed mode.

6. The system of claim 1, wherein the data regarding switching of the power line is communicated to the HVAC controller via the transfer switch.

7. The system of claim 6, wherein the data regarding switching of the power line and the capacity of power source is communicated to the HVAC controller via a relay switch.

8. The system of claim 1, further comprising a backup power source controller operatively associated with the backup power source, wherein the data regarding switching of the power line is communicated to the HVAC controller via the backup power source controller.

9. The system of claim 8, wherein the capacity of the power source is communicated to the HVAC controller via the backup power source controller.

10. An HVAC controller for managing power consumption of an HVAC system, comprising:
    an interface configured to receive a signal indicative of an operating status of a backup power source that powers the HVAC system when utility power is unavailable;
    a processor operatively coupled to the interface; and
    a memory operatively coupled to the processor and including a set of executable instructions, which, when executed by the processor, cause the HVAC controller to reduce a maximum power consumption of the HVAC system when the backup power source is powering the HVAC system, including reducing the maximum operating speed of one or more rotary components of the HVAC system, or modifying a setpoint of the HVAC system in which a temperature setpoint is raised or lowered while in respectively a cooling mode or a heating mode.

11. The HVAC controller of claim 10, wherein the interface configured to receive a signal indicative of an operating status of a backup power source includes a data interface configured to receive a data signal from an internet server operatively associated with the backup power source.

12. The HVAC controller of claim 10, wherein the signal indicative of an operating status of a backup power source includes information selected from the group consisting of maximum power capacity, available power, current power usage, fuel level, and remaining runtime.

13. The HVAC controller of claim 10, wherein the interface includes a current sensor attachable to a power feed of the backup power source.

14. The HVAC controller of claim 10, wherein the interface includes a data interface configured to receive a data signal from a backup power source controller operatively associated with the backup power source.

15. The HVAC controller of claim 10, wherein the interface includes a sensor that senses a property of a power input to the HVAC controller selected from the group consisting of frequency, waveshape, harmonic content, jitter, and amplitude.

16. A method for managing power consumption of an HVAC system, comprising the steps of:
providing an HVAC system comprising a transfer switch, a detector, and an HVAC controller, wherein the detector is in communication with the transfer switch or a controller of a backup power source, and the HVAC controller;
switching a utility power line of the utility power source connected to a load of the HVAC system to a generator power line of the backup power source;
detecting and sending data relating to switching of the power line to the HVAC controller;
receiving a data of the backup power source by the HVAC controller; and
controlling an operation of one or more components of the HVAC system based on the data of the backup power source to reduce power consumption the HVAC system, including reducing the maximum operating speed of one or more rotary components of the HVAC system, or modifying a setpoint of the HVAC system in which a temperature setpoint is raised or lowered while in respectively a cooling mode or a heating mode.

17. The method of claim 16, wherein the data of the backup power source includes information is selected from the group consisting of maximum power capacity, available power, current power usage, fuel level, and remaining runtime.

18. The method of claim 16, wherein the provided detector is selected from the group consisting of a current sensor, a relay switch, and a data link.

* * * * *